(12) United States Patent
Huggett et al.

(10) Patent No.: US 8,280,373 B2
(45) Date of Patent: Oct. 2, 2012

(54) TERMINAL DEVICE CONTROL SERVER AND METHOD FOR CONTROLLING ACCESS TO A MOBILE COMMUNICATION NETWORK

(75) Inventors: Robert Huggett, Reading (GB); Nicholas John Lord, Reading (GB); Mark Hopper, Montreal (CA); Jiwei Robert Wang, Kanata (CA); Martin Dennis Williams, Hampshire (GB)

(73) Assignee: Airwide Solutions Inc., Kanata, ON (CA)

( * ) Notice: Subject to any disclaimer, the term of this patent is extended or adjusted under 35 U.S.C. 154(b) by 1211 days.

(21) Appl. No.: 11/849,940

(22) Filed: Sep. 4, 2007

(65) Prior Publication Data

US 2009/0061863 A1 Mar. 5, 2009

(51) Int. Cl.
*H04W 4/00* (2009.01)
(52) U.S. Cl. .......... 455/434; 455/435.1; 455/521; 455/411
(58) Field of Classification Search .......... None
See application file for complete search history.

(56) References Cited

U.S. PATENT DOCUMENTS

| | | | | | |
|---|---|---|---|---|---|
| 5,809,413 | A | * | 9/1998 | Meche et al. | 455/411 |
| 6,091,946 | A | * | 7/2000 | Ahvenainen | 455/411 |
| 6,400,939 | B1 | | 6/2002 | Virtanen et al. | |
| 7,860,488 | B2 | * | 12/2010 | Wollersheim et al. | 455/414.1 |
| 2004/0005875 | A1 | | 1/2004 | Ko et al. | |
| 2005/0280557 | A1 | | 12/2005 | Jha et al. | |
| 2006/0009214 | A1 | | 1/2006 | Cardina et al. | |
| 2006/0030368 | A1 | | 2/2006 | Soelberg | |
| 2006/0129638 | A1 | | 6/2006 | Deakin | |

FOREIGN PATENT DOCUMENTS

WO 96/36194 A1 11/1996

OTHER PUBLICATIONS

TSG-S: Service and System Aspects, Technical Specification Group; 3G Mobile Equipment Identifier (MEID) Stage 1, 3GPP2 S.R0048-A Version 4.0; Jun. 23, 2005; 3rd Generation Partnership Project 2, Internet Publication, pp. 1-15.
TSG-X: Core Networks, Technical Specification Group; MAP Support for the Mobile Equipment Identity (MEID), 3GPP2 X.S0008-0 Version 2.0; Oct. 2005, 3rd Generation Partnership Project 2, Internet Publication, 57 pages.

* cited by examiner

*Primary Examiner* — Willie J Daniel, Jr.
(74) *Attorney, Agent, or Firm* — Shalom Wertsberger; Saltamar Innovations

(57) ABSTRACT

An apparatus and a method for a terminal device control server. The terminal device control server collecting, storing and providing information (i.e. device intelligence) relating to a plurality of terminal devices in a mobile communication network. A policy based control mechanism can be used in conjunction with one or more authorization lists and the device intelligence to respond to requests from various elements in the network to allow or deny access to the network or to services within the network to specific terminal devices. The device intelligence can alternatively be used to improve the effectiveness of service offerings in the network by providing information associated with a specific terminal device to other elements that adapt their services offerings and interactions to the capabilities of the specific terminal devices.

20 Claims, 8 Drawing Sheets

TERMINAL DEVICE CONTROL SERVER AND METHOD FOR CONTROLLING ACCESS TO A MOBILE COMMUNICATION NETWORK

FIELD OF INVENTION

The present invention relates to the field of mobile communication networks. In particular, to an apparatus and a method for a terminal device control server in a mobile communication network.

BACKGROUND

The popularity of mobile communication devices such as, for example, mobile telephones, wireless data devices and similar devices has resulted in more and more such devices being used in mobile communication networks. In addition to the growing number of subscribers in such networks, the network operators are also faced with supporting large numbers of devices that are roaming onto their networks.

The capacity of a mobile communication networks is typically statistically engineered based on a number of operating assumptions. When these assumptions are violated the demands for service in the network can exceed the capacity resulting in denial of service for some users (i.e. subscribers and roamers). In an effort to control cost and complexity, network operators ideally plan their networks to have enough capacity for anticipated peak demands within their operating assumption with a small additional margin of capacity.

In order to ensure that users can receive service from the network when they want it, it is necessary that the network operator be able to control access to the network by individual terminal devices (i.e. mobile communication devices). Examples of terminal devices that may be denied access to the network in favor of other devices include: stolen devices, black-market devices, non-subsidized devices, imported devices and devices of types with certain capabilities not supported by the network operator. In addition, some terminal devices may be denied access to the network or to specific services offered in the network based on the devices' lack of certain capabilities and where the user associated with the device does not subscribe to any services (e.g. Push-to-Talk and Push-to-X) that requires a particular capability (e.g. always connected Internet Protocol (IP) access).

During some events such as natural disasters, terrorist attacks or major mishaps, the mobile communication network can become overloaded with a surge in use of the network services. An unfortunate consequence can be that service is denied (by lack of capacity) to responders to the event (e.g. emergency response crews, government agencies and the military) who depend on the network for communications. In these cases it would be desirable to be able to control or limit access to the network to only certain terminal devices on a prioritized basis.

In addition to the situations described above, the network can also suffer from diminished usable capacity when some capacity is lost due to inefficient or ineffective use of the network capacity. For example, when a multimedia message (MM) is sent to a terminal device the multimedia message service center (MMSC) attempts a session initiation request (SIR) with the destination terminal device. If the terminal device is not multimedia message service (MMS) capable the SIR will eventually time-out and the MMSC can attempt sending the MM via another means such as email, a Wireless Application Protocol (WAP) push or a short message (SM) containing a web Universal Resource Locater (URL) referring to the MM content. When a significant number of MM are sent to non-MMS capable terminal devices, then the resulting attempted SIR and time-outs contribute to the inefficient use of network capacity. Furthermore, the time-outs are typically twenty-four hours or longer resulting in the loss of timeliness in delivering the MM.

The effectiveness of the network can also be impacted when senders of significant numbers of messages such as, for example, value added service providers (VASP) do not know the capabilities of destination terminal devices and therefore network assets such as, for example, a MMSC must provide services such as trans-coding of the messages to adapt them to the capabilities of individual terminal devices. Such adaptation is typically inferior to content tailored by a VASP that knows the target device capability.

Lack of information characterizing individual terminal devices in the network and their associated patterns of usage also renders more complex certain activities such as, for example, tracking of specific devices by law enforcement agencies, tracking of stolen devices, authentication and authorization for high security application (e.g. e-commerce, enterprise specific applications), the migration of individual subscribers from one device to a replacement device, and the blocking of junk message (a.k.a. spam) originating devices.

The 3rd Generation Partnership Project (3GPP) technical specification "International Mobile Station Equipment Identities (IMEI)" TS22.016 Release 6 (v 6.0.0) and earlier releases define International Mobile Station Equipment Identities (IMEI) used to uniquely identify a mobile device and an Equipment Identity Register (EIR). The 3rd Generation Partnership Project 2 (3GPP2) technical specification "3G Mobile Equipment Identifier (MEID)" 3GPP2 S.R0048-A (Version 4.0) and earlier versions define a similar mobile device identifier called the Mobile Equipment Identifier (MEID). The 3GPP2 technical specification "MAP Support for the Mobile Equipment Identity (MEID)" 3GPP2 X.S0008-0 (Version 2.0 and earlier versions) defines the validation procedures for MEID) by the EIR. The EIR receives device authorization requests from network elements such as, for example, Mobile Switching Center (MSC), Serving GPRS Support Node (SGSN) and Visitor Location Register (VLR) in the form of a Mobile Application Part (MAP) protocol checkIMEI request or alternatively checkMEID request. The checkIMEI request contains parameters including an international mobile equipment identity (IMEI) and optionally additional identifiers including, for example, an international mobile subscriber identity (IMSI) or a directory number (e.g. Mobile Station International Subscriber Directory Number (MSISDN)). The checkIMEI request can be sent when a terminal device enters the network, when the terminal device attempts to use a service in the network or periodically. As the IMEI and the MEID and their respective validation requests checkIMEI and checkMEID are functionally equivalents, it is to be understood that where the terms IMEI and checksIMEI are used in this document the description applies to the MEID and checkMEID respectively unless otherwise noted.

FIG. 1 is a schematic representation of an exemplary EIR 100 in accordance with 3GPP TS22.016 in a typical network environment. The EIR 100 receives checkIMEI requests, containing the IMEI of a terminal device 108, from MSC 102 or SGSN 104 connected to the mobile network 106. The EIR 100 typically contains a local white list, a local black list and a local grey list. In response to the checkIMEI request the EIR 100 searches the lists 110 for a match to the IMEI contained in the request. The lists 110 are searched in a predetermined order. A response is sent to the originator of the request indicating which list 110 contained the IMEI provided in the checkIMEI request. Inclusion of the IMEI in the white list signifies that the corresponding terminal device 108 is allowed access to the network 106. Inclusion in the black list signifies that the terminal device 108 should be denied access to the network 106. Inclusion in the grey list signifies that the terminal device 108 is subject to special handling such as, for example, being traced in the network 106. If the IMEI contained in the checkIMEI request is not found in any of the lists 110, the response indicates that the IMEI is unknown.

SUMMARY OF INVENTION

An apparatus and a method for a terminal device control server. The terminal device control server collecting, storing and providing information (i.e. device intelligence) relating to a plurality of terminal devices in a mobile communication network. A policy based control mechanism can be used in conjunction with one or more authorization lists and the device intelligence to respond to requests from various elements in the network to allow or deny access to the network or to services within the network to specific terminal devices. The device intelligence can alternatively be used to improve the effectiveness of service offerings in the network by providing information associated with a specific terminal device to other elements that can adapt their services offerings and interactions to the capabilities of the specific terminal devices.

In accordance with another aspect of the present invention, there is provided, a terminal device control server for collecting, storing and providing information relating to a plurality of terminal devices in a mobile communication network, each terminal device having an associated equipment identifier, the terminal device control server comprising: a device control interface for receiving a terminal device authorization request, containing an equipment identifier and optionally containing any of: a subscriber identifier, a directory number, and a location, and for providing a terminal device authorization response; a device intelligence database for storing a plurality of authorization lists each containing a plurality of equipment identifiers and for collecting and storing additional information associated with each equipment identifier including any one or more of: a subscriber identifier, a subscriber type, a directory number, a location in the mobile communication network, a service package subscription, a network membership, a device capability set, and one or more timestamps each associated with one of the other additional information; a network information access interface providing for the terminal device control server to request and receive from other equipment platforms in the mobile communication network any of the additional information associated with each equipment identifier; and a control policy database for storing and applying a plurality of control policies to determine which of the plurality of authorization lists will be applied and in what order the authorization lists will be applied in generating the terminal device authorization response containing a favorable device status based on a result of searching the applied authorization lists for a match to a criterion containing the equipment identifier and optionally any of the subscriber identifier, the directory number and the location received in the terminal device authorization request, the terminal device authorization response optionally containing any one or more of a subscriber type associated with the subscriber identifier, and a service package subscription associated with the subscriber identifier; wherein a receiver of the terminal device authorization response can, based on the response, either allow or deny access to the mobile communication network and to services in the network to the terminal device having the equipment identifier contained in the terminal device authorization request.

In accordance with another aspect of the present invention, there is provided a method for a terminal device control server in a mobile communication network, the network having a plurality of terminal devices each having an equipment identifier, the method comprising the steps of: receiving a terminal device authorization request containing an equipment identifier and optionally containing any of: a subscriber identifier, a directory number, and a location; selecting a control policy from a plurality of control policies; searching one or more authorization lists, selected from a plurality of authorization lists and in an order that is responsive to the selected control policy, for a match to a criterion containing the equipment identifier and optionally any of the subscriber identifier, the directory number and the location; and providing a terminal device authorization response containing a favorable device status based on a result of the authorization list search, and optionally containing any one or more of a subscriber type associated with the subscriber identifier, and a service package subscription associated with the subscriber identifier; wherein a receiver of the terminal device authorization response can, based on the response, either allow or deny access to the mobile communication network and to services in the network to the terminal device having the equipment identifier contained in the device authorization request.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

The present invention will be described in conjunction with drawings in which.

DETAILED DESCRIPTION

Figure 1:
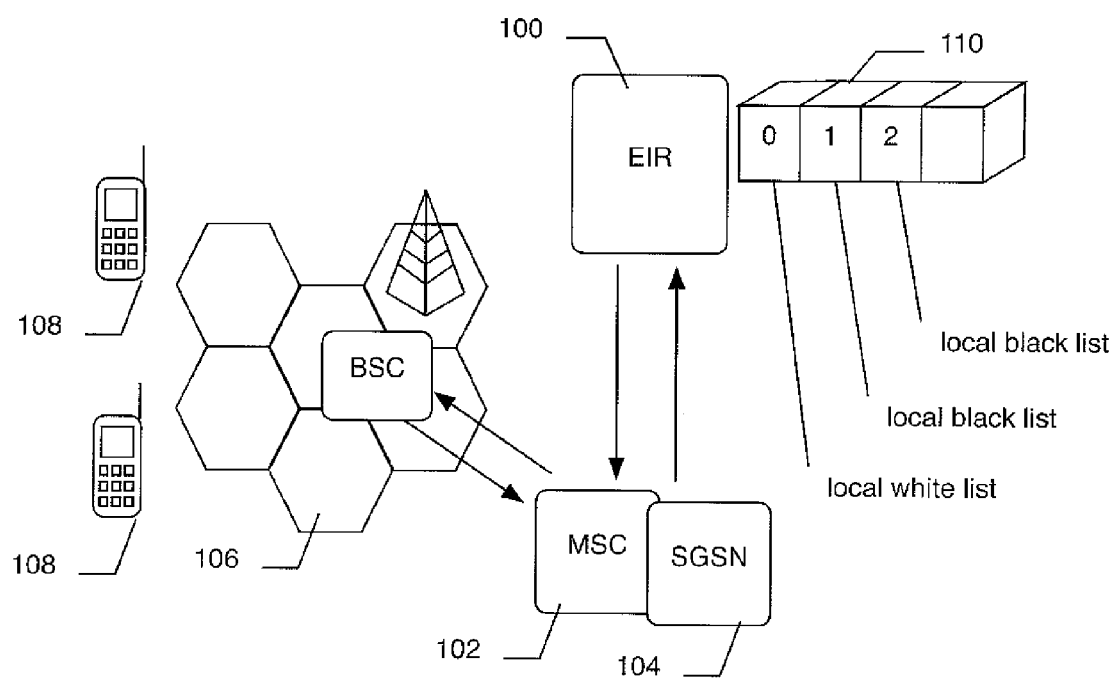
FIG. 1 is a schematic representation of an exemplary Equipment Identity Register in accordance with 3GPP TS22.016.
Figure 2:
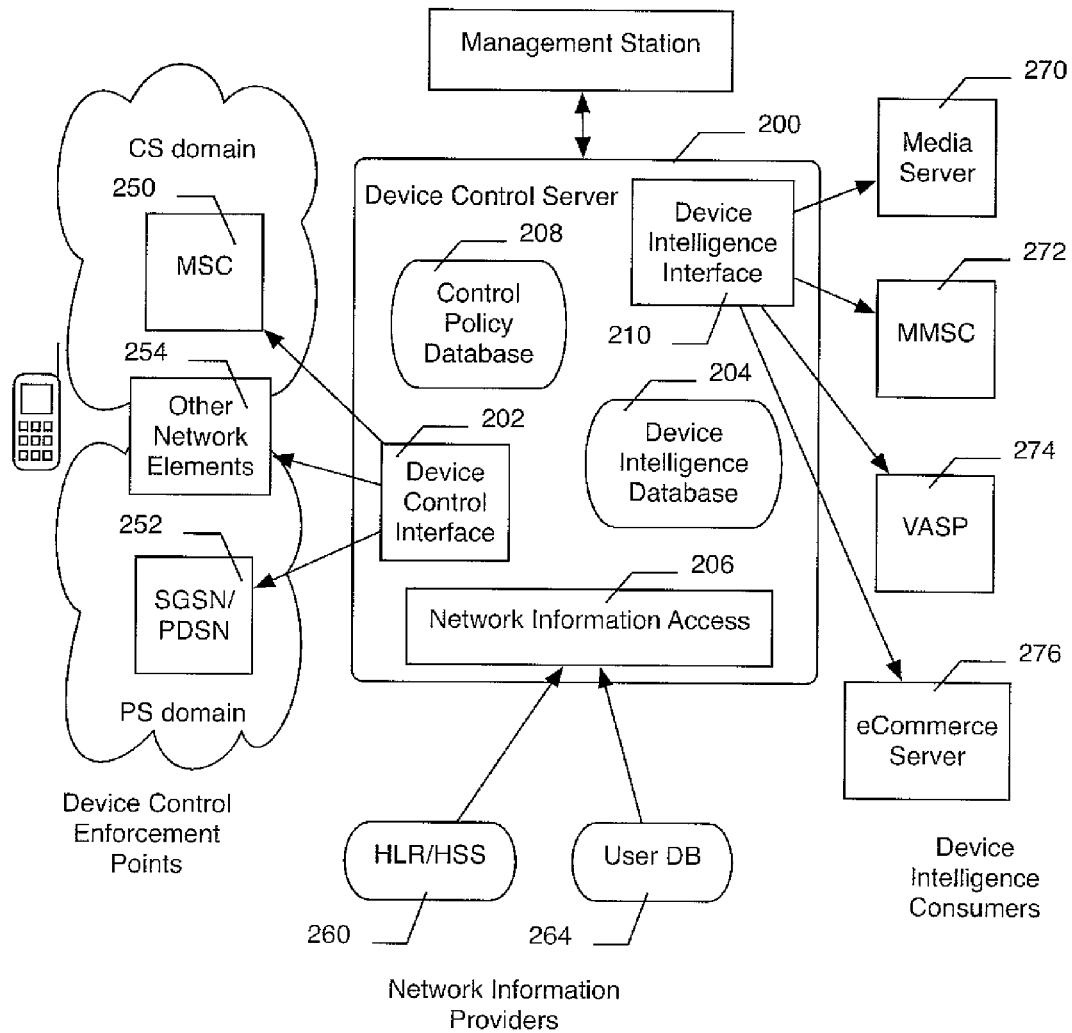
FIG. 2 is a schematic representation of an exemplary embodiment of a terminal device control server.

FIG. 2 is a schematic representation of an exemplary embodiment of a terminal device server 200. The terminal device control server (herein after the control server) 200 comprises a device control interface 202, a device intelligence database 204, a network information access interface 206, a control policy database 208, and a device intelligence interface 210.

The device control interface 202 can receive terminal device authorization requests from elements in the network such as, for example, a mobile service center (MSC) 250, a Serving GPRS Support Node (SGSN) 252, Packet Data Serving Node (PDSN) 252 and other similar network elements 254. The requests can, for example, be checkIMEI requests in accordance with 3GPP technical specification "International Mobile Station Equipment Identities (IMEI)" TS22.016. Each request contains an equipment identifier. The equipment identifier is associated with a terminal device for which authorization in a network is being sought. The equipment identifier associated with the terminal device is preferably unique but in typical use is not always unique. Multiple terminal devices can have the same equipment identifier; these handsets are commonly referred to as cloned. In an alternative embodiment an extended version of checkIMEI can be used in which the request contains an equipment identifier and optionally any of a subscriber identifier, a directory number, a location and a corresponding timestamp. The equipment identifier can, for example, include an IMEI, the subscriber identifier can, for example, include an International Mobile Subscriber Identity (IMSI), the directory number can, for example, include a Mobile Station International Subscriber Directory Number (MSISDN), and the location can, for example, include a network cell identifier. The timestamp indicates when a parameter in the checkIMEI request such as, for example, the location is ascertained (i.e. is current or up-to-date). The device control interface 202 can provide a terminal device authorization response corresponding to the received terminal device authorization request. The terminal device authorization response is sent to originator of the terminal device authorization request.

The device intelligence database 204 can store a plurality of equipment identifiers (e.g. IMEI or MEID). Each equipment identifier can be included in one or more of a plurality of authorization lists. The authorization lists can include one or more white lists, one or more black lists, one or more grey lists, and one or more other lists. Each authorization list is arranged to be searched for a match to a search criterion. For each authorization list the criterion can, for example, be one of: an equipment identifier (e.g. IMEI), an equipment identifier and an associated subscriber identifier (e.g. IMEI-IMSI pair), an equipment identifier and an associated directory number (e.g. IMEI-MSISDN pair), and any of the forgoing criterion in combination with a location. Authorization lists arranged to be search by equipment identifier (e.g. IMEI) are preferably used where the equipment identifier is expected to be unique. Authorization lists arranged to be searched by equipment identifier in combination with another identifier (e.g. IMEI-IMSI or IMEI-MSISDN pair) are preferably used where it is anticipated that some equipment identifiers may not be unique. The devices intelligence database can also collect and store additional information associated with each equipment identifier including any of: a subscriber identifier, a subscriber type, a directory number, a location in the mobile communication network, a service package subscription, network membership, and a device capability set. The subscriber identifier can, for example, be an IMSI. The directory number can, for example, be a MSISDN or other similar directory number. The location in the network can, for example, be designated by a network cell identifier, a network element (e.g. MSC, SGSN, PDSN, VLR) identifier, GPS coordinates (e.g. supplied by the terminal device), or other similar location designations. The location information can also include a timestamp. The timestamp indicates when the location was ascertained. The timestamp can be used to determine when the location was last known or when the terminal device was last used. In one embodiment the device intelligence database 204 can store multiple entries of the location information including multiple corresponding timestamps. A history or pattern of use of the terminal device can be derived for the multiple location entries and the corresponding timestamps. The device capability list can, for example, indicate capabilities of the device including service capability, functional capability and networking capability. Service capability can, for example, include support for: Wireless Application Protocol (WAP), Multimedia Message Service (MMS), Java™, Brew®, and streaming-video. Functional capabilities can, for example, include: having a color screen, screen resolution, and having a camera. Networking capabilities can, for example, include support for: Bluetooth®, General Packet Radio Service (GPRS), Enhanced Data Rates for GSM Evolution (Edge), $3^{rd}$ generation (3G) mobile communications, and Wi-Fi™. Parameters received in a terminal device authorization request such as, for example, a subscriber identifier, a directory number, a location and a corresponding timestamp can be used as a source of additional information associated with each equipment identifier. Other sources of additional information are described below.

The device capabilities for various terminal devices can, for example, be obtained from the manufacturers or distributors of the terminal devices. Device capability sets for each make (i.e. manufacturer) and model of terminal device can be loaded and stored in the device intelligence database 204. Additionally, a mapping table or function that generates the make and model for a given equipment identifier (e.g. IMEI) can be loaded and stored in the device intelligence database 204.

The device intelligence database 204 can also store other information (e.g. the one or more other lists) including, for example, stolen handsets, local network subscribers, and historical information related to IMEI and queries made on the device intelligence database 204. The information stored in the device intelligence database 204 can be in the form of one or more tuples. Each tuple is associated with one equipment identifier and the tuple can contain any of: an equipment identifier, a user identifier (containing a subscriber identifier and a directory number), a device capability set, device network attributes, device usage signature, and a plurality of timestamps. The device network attributes can, for example, include a device location (e.g. the identifier of a network cell to which the terminal device is connected) and network membership (e.g. home subscriber, roamer from a partner or stranger network). The device usage signature can include an indication of terminal devices registered usage pattern (e.g. emergency calls only). The plurality of timestamps represents when the information in the tuple was last entered or validated (e.g. when the terminal device as last seen by the network). Each timestamp can be associated with (i.e. correspond to) a subset of the parameters in a tuple such as, for example, an IMSI-IMSI pair, an IMSI-MSISDN pair and a location.

The network information access interface 206 provides for the control server 200 to request and receive from other equipment platforms (i.e. other network elements) in the mobile communications network any of the additional information associated with each equipment identifier. The other equipment platforms can, for example, include a Home Location Register (HLR) 260, a Home Subscriber Server (HSS) 260, a user database 264, and other similar network information providing platforms. The requests for network information can contain a subscriber identifier (e.g. IMSI) corresponding to an equipment identifier (e.g. IMEI). The response to the request for network information can contain a directory number (e.g. MSISDN) and a location corresponding to the subscriber identifier. Alternatively, the request for network information can contain a directory number (e.g. MSISDN) and the response to the request for network information can contain a subscriber identifier (e.g. IMSI).

The control policy database 208 can store and apply a plurality of control policies to determine which of the plurality of authorization lists will be applied and in what order the authorization lists will be applied in generating each terminal device authorization response. Inclusion of an equipment identifier, optionally in combination with any of a subscriber identifier, a directory number and a location, in any of the white lists signifies that the terminal device associated with the equipment identifier is to be given access to the network and/or one or more services in the network. Inclusion of an equipment identifier, optionally in combination with any of a subscriber identifier, a directory number and a location, in any of the black lists signifies that the terminal device associated with the equipment identifier is to be denied access to the network and/or one or more services in the network. Inclusion of an equipment identifier, optionally in combination with any of a subscriber identifier, a directory number and a location, in any of the grey list signifies that the terminal device associated with the equipment identifier is subject to special handling. The control policies include a default policy that is applied in the absence of an indication to apply another control policy. The specific control policies can be applied in response to configuration parameter settings for the control server 200, to the subscriber identifier associated with the equipment identifier, to input parameters contained in the terminal device authorization request (e.g. Signaling Connection and Control Part (SCCP) address of the request originator), the directory number associated with the equipment identifier received in the terminal device authorization request, the device capability set, service package subscription, subscriber type, location in the network, network membership, billing status and the capacity demand level in the network. The SCCP address of the request originator can, for example, be used to determine if the terminal device authorization request relates to a voice service (e.g. MSC), a data service (e.g. SGSN or PDSN), a 2.5 generation (2.5G) or a $3^{rd}$ generation (3G) network. The determination can be a function of one or more components of the SCCP address such as, for example, the network indicator, the routing indicator, the point code and the subsystem number (SSN).

In one embodiment, the black lists can include one or more deferred-barring lists and an immediate-barring list. The deferred-barring lists are searched first for a match to a search criterion containing an equipment identifier optionally in combination with any of a subscriber identifier, a directory number and a location. When a search criterion is matched in a deferred-barring list, a warning message (e.g. "Please contact a customer service representative immediately.") is sent to the corresponding terminal device or a time-out period begins and the equipment identifier is removed from the deferred-barring list. When an acknowledgement that the message was sent is received or the time-out period expires, the equipment identifier is either moved to another of the deferred-barring lists or is added to the immediate-barring list. When a search criterion is matched in the immediate-barring list the corresponding terminal device is to be denied access to the network or to a specific service in the network.

The device intelligence interface 210 provides for receiving terminal device information requests containing a directory number associated with a terminal device and for providing a terminal device information response for the equipment identifier corresponding to the directory number in the terminal device information request. In an alternative embodiment the terminal device information request can instead contain any other identifier (e.g. IMSI, make/model of terminal device) than can be associated with an equipment identifier. The terminal device information request can, for example, originate from a media server 270, multimedia message service center (MMSC) 272, value-added service provider (VASP) 274, eCommerce server 276 or other similar device information consuming platforms. The terminal device information response can contain any of: an equipment identifier, a subscriber identifier, a location in the mobile communication network, a network membership, subscription attributes, subscription package details and a device capability set. The terminal device information requester can use the information contained in the terminal device information response to adapt services to and interactions with terminal devices to the particularities of each terminal device. The information in the device intelligence database 204 can also be accessed for the purpose of data-mining for distributions, trends and patterns. The device intelligence interface 210 can also provide for a user of device intelligence information (e.g. VASP) to register trigger events for which it wishes to receive notification. The trigger events can, for example, include when a terminal device associated with a trigger group first enters the network, is in a particular location or is in a particular location at a particular time. The trigger group can, for example, contain one or more of any of: a equipment identifier, a subscriber identifier, a directory number, a device type, a subscription type, a service package subscription, a network membership and a device capability. The device intelligence interface 210 can provide the notification including device intelligence information. The trigger event registration and notification can be implemented using any of a number of well-known publish-subscribe models.

In an alternative embodiment the device intelligence interface 210 provides for receiving terminal device information requests containing a location and for providing a terminal device information response containing the equipment identifiers of terminal devices whose last known (i.e. most recent) location is the same as the location in the information request or alternatively within a pre-determined distance of the location in the information request. In a further alternative embodiment, the device intelligence interface 210 provides for receiving terminal device information requests and for providing a terminal device information response containing one or more equipment identifiers of terminal devices (e.g. including all of the terminal devices in the network) and the last known (i.e. most recent) location associated with each terminal device.

Figure 3:
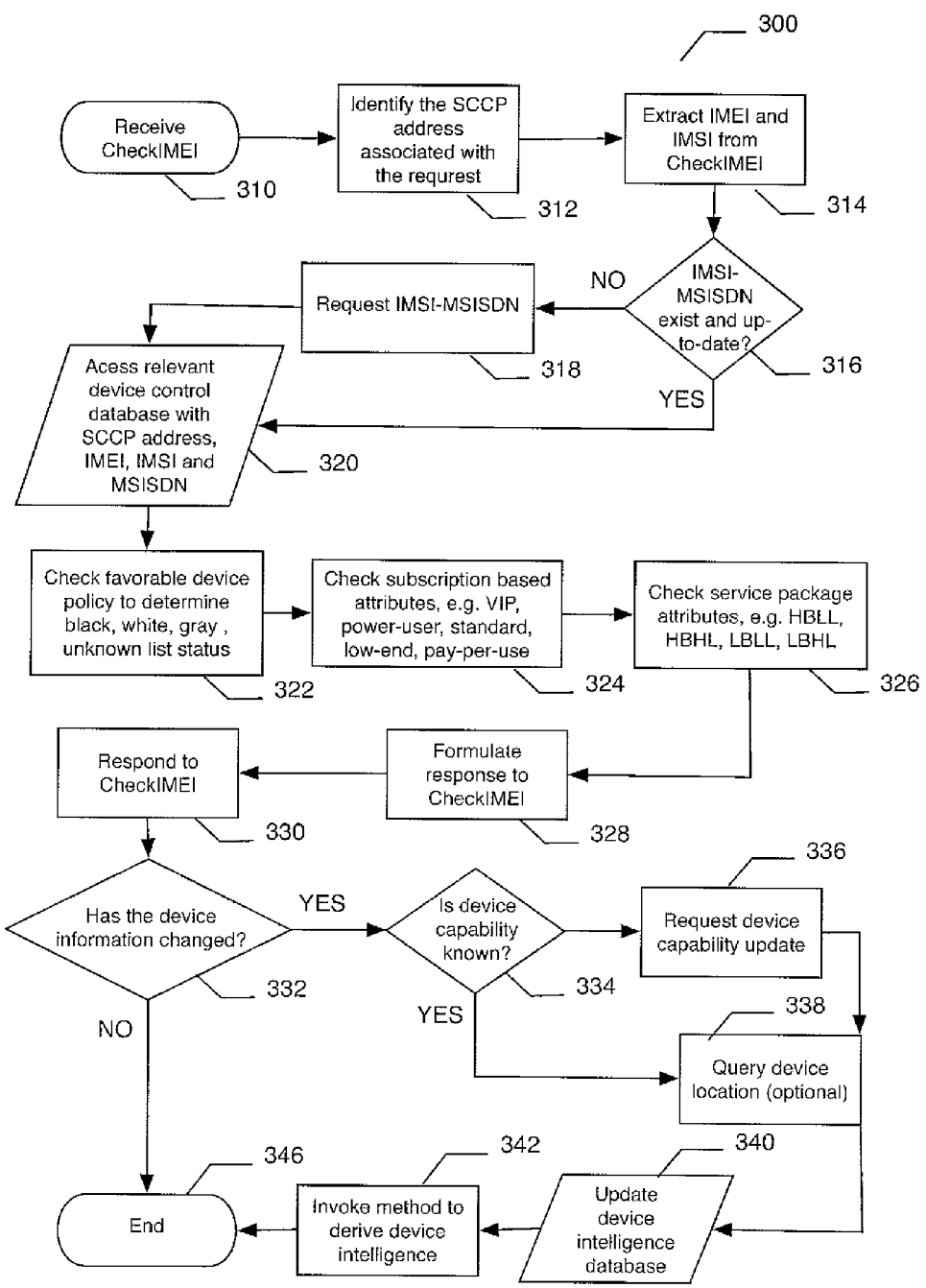
FIG. 3 is a flowchart representation of the steps in an exemplary embodiment of a method for a terminal device control server.

FIG. 3 is a flowchart representation of the steps in an exemplary embodiment of a method 300 for a terminal device control server 200. The method 300 can, for example, be implemented using the terminal device control server 200 as described above with reference to FIG. 2. In step 310 a terminal device authorization request in the form of a checkIMEI message is received. The checkIMEI message contains an equipment identifier in the form of an IMEI corresponding to a terminal device (a.k.a. a handset). The checkIMEI request and a corresponding response can, for example, be sent using the Global System For Mobile Communications (GSM) Mobile Application Part (MAP) Phase 1 or Phase 2 protocol over the Signaling System 7 (SS7) signaling protocol. In an alternative embodiment the terminal device authorization request can take the form of an extended version of the checkIMEI operation that also contains any of a subscriber identifier (e.g. an IMSI), a directory number (e.g. a MSISDN) and a location (e.g. a network cell identifier).

In step 312 the Signal Connection and Control Part (SCCP) address of the checkIMEI request originator can be determined. In step 314 the IMEI and optionally the IMSI contained in the checkIMEI message can be extracted. In step 316 a check is made to determine if a MSISDN corresponding to the IMSI is known (i.e. is stored in the device intelligence database 204 or provided in the CheckIMEI request) and is up-to-date. The determination whether the MSISDN is up-to-date or not can be based on comparing a timestamp associated with the MSISDN in the device intelligence database 204 with a predetermined expiry time period (e.g. one month). If the MSISDN is not known or is not up-to-date, then a request is made via the network information access interface 206 to one of the network information providing platforms to obtain a current MSISDN.

In step 320 the device intelligence database 204 is accessed providing the SCCP address, IMEI, IMSI and MSISDN as input parameters. In step 322 the order in which the authorization lists are searched can be configured using one or more control policies stored in the control policy database 208. The order for searching authorization lists also determines which lists are included and excluded from the search in the case where there are multiple white, grey and black lists. A default control policy can be used in the absence of an indication to use another control policy. Alternatively, a control policy can be provided for a particular individual or group of IMSI, for example, in the case of roamers or of partner-network blacklists. When the checkIMEI message contains an IMSI and a control policy corresponding to the IMSI received in the checkIMEI message exists in the control policy database 208, then that control policy is applied in the search for a match for the IMEI. The control policies can be adapted to the desired handling of a case in which the IMEI exists in multiple authorization lists (e.g. both a white list and a black list (e.g. a reported stolen terminal device)). Selection of the control policy can also be based on terminal device control server configuration parameters and on input parameters (e.g. the SCCP address of the request originator) received in the terminal device authorization request.

The authorization lists are searched looking for a match for the IMEI. The result of the authorization list search is that the IMEI was found in one of a white list, a black list, a grey list or that the IMEI was not found in any list. When the IMEI is not found the result is that the IMEI is 'unknown' or alternatively the result is set to a value determined by the control policy. By controlling the order in which the authorization lists are searched and the inclusion and exclusion of authorization lists, the control policy determines which result occurs when the IMEI is present in more than one authorization list.

In step 324 subscription attributes can also be associated with the equipment identifier and taken into consideration in generating a response to the terminal device authorization request. The subscription-based attributes can include a subscriber type designation such as, for example, VIP (e.g. government agent, emergency responder, police, fire fighter), power-user, standard-user, low-end user, pay-per-use. In certain circumstances (e.g. a public emergency) a control server 200 parameter can be set that limits the authorization (i.e. access to the network and services in the network) to specific subscriber types or provides prioritized access based on subscriber type.

In step 326 service package subscription information can also be associate d with the equipment identifier and taken into consideration in responding to the terminal device authorization request. The service package subscription information can indicate which specific services (e.g. video call, mobile TV, file transfer protocol (FTP), instant messaging (IM), MMS) are subscribed to. By denying authorization (i.e. access to services) to terminal devices that are not subscribed to a specific service, the load on network elements (e.g. SGSN) that support that service can be reduced.

In step 328 additional validations can optionally be executed based on one or more configuration parameters for the terminal device control server 200. When, for example, the authorization list search uses the default control policy, an IMSI is supplied as a parameter to the checkIMEI request and the result of the search is that the IMEI is not in a black list, then the IMEI and IMSI can be validated against a Mobile-Station list. The Mobile-Station list is stored in the device intelligence database 204. When the IMEI is not found in the Mobile-Station list, then no further action is taken. When the IMSI/IMEI combination in the Mobile-Station list is the same as the IMEI and the IMSI of the checkIMEI request then no further action is taken. When the IMEI is found in the Mobile-Station list but the IMSI received in the checkIMEI request does not match the IMSI paired with the IMEI in the Mobile-Station list then the result of the checkIMEI is changed to black list. The enforcement of the IMSI/IMEI pairings in the Mobile-Station list can be referred to as IMSI/IMEI locking.

In another exemplary optional validation the IMEI/IMSI combination can be validated against a Cloned-Handset-User list. When this validation is configured it is executed regardless of which control policy was used in the authorization list search. When the IMEI/IMSI combination is not found in the Cloned-Handset-User list no further action is taken. When the IMEI/IMSI combination provided in the checkIMEI request is found in the Cloned-Handset-User list, the result of the checkIMEI is overridden to a pre-determined value (e.g. white list) based on a cloned-handset-response configuration parameter. The Cloned-Handset-User list provides for the use of a terminal device having a non-unique IMEI by a legitimate user.

In step 330 the result of the authorization list search, taking into consideration the subscriber type information, the subscriber package information and any additional optional validations, is sent to the originator of the checkIMEI request in the form of a checkIMEI response. The checkIMEI response can be in accordance with 3GPP TS 22.016 or in an alternative embodiment the checkIMEI response can include return parameters indicating favorable device status (e.g. white, black, or grey list or unknown and stolen, black-market and unsupported handset indications), subscription type (e.g. VIP, power-user), and service package subscription (e.g. video call, mobile TV, IM, MMS). The recipient of the checkIMEI response (e.g. MSC or SGSN) can act as a device control enforcement point to deny access to the network or to specific services in the network to the terminal device corresponding to the IMEI (i.e. equipment identifier) contained the checkIMEI request (i.e. the terminal device authorization request).

In step 332 whether or not the information corresponding to the device identifier has changed can be ascertained by comparing the IMEI/IMSI pair with that stored in the device intelligence database 204. When the information has not changed then processing is done (step 346). When the information has changed, whether or not the device capability is known can be ascertained in step 334. When the device capability is known the method can proceed to step 338. When the device capability is not known, a request to update the device capability can be made in step 336. The device capability can be updated, for example, by looking up the equipment identifier in the device capability make/model information stored in the device intelligence database 204.

In step 338 the location of the terminal device corresponding to the equipment identifier can be queried from a network information providing platform via the network information access interface 206.

In step 342 the control server 200 can, based on configuration parameters, collect and store device intelligence for terminal devices when any of one or more configurable trigger events occurs. The trigger events can include, for example, when a terminal device is in a particular location or in a particular location at a particular time, when the terminal device being used by a subscriber changes, when a new roamer is identified, and when fraudulent activity is detected. Device intelligence information can, for example, be derived and stored in the device intelligence database 204 by executing the steps described below with reference to FIGS. 4-8. After the steps have been executed processing ends 346.

Figure 4:
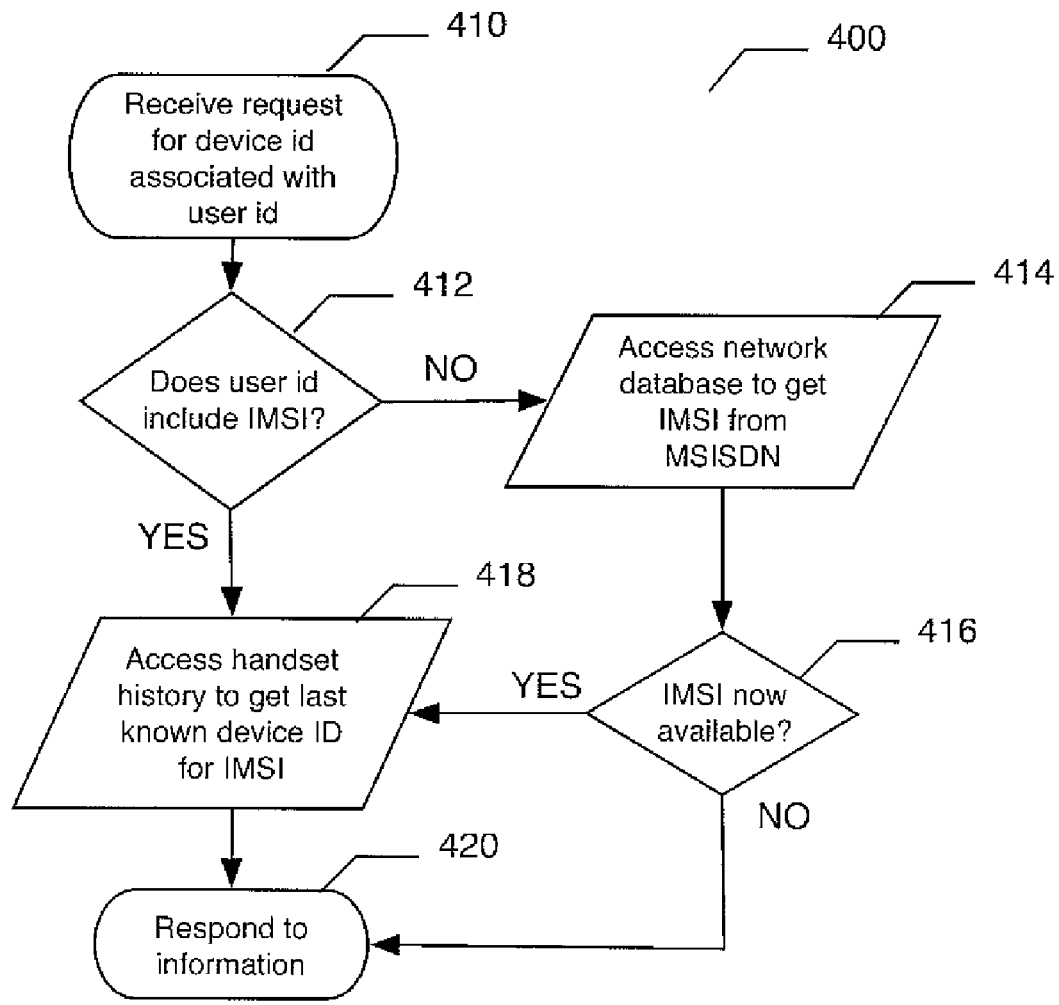
FIGS. 4-8 are flow diagrams representing the steps in exemplary device intelligence derivations

FIGS. 4-8 are flow diagrams representing the steps in exemplary device intelligence derivations. FIG. 4 represents exemplary steps 400 in finding an equipment identifier associated with a user identifier. The user identifier can include either or both of a subscriber identifier (e.g. IMSI) and a directory number (e.g. MSISDN). A request is received 410 for the device identifier associated with a user identifier. A check 412 is made to determine if the user identifier includes an IMSI (i.e. a subscriber identifier). When the user identifier does not include an IMSI, the network information access interface 206 is accessed 414 to retrieve the IMSI corresponding to the MSISDN. A check 416 is made to determine if the IMSI is available. When the IMSI is not available, a response indicating that the subscriber identifier is unknown is sent 420. When the user identifier includes an IMSI or the IMSI is retrieved from the network database, historic information in the device intelligence database 204 is accessed 418 to determine the last known device identifier (i.e. equipment identifier) associated with the IMSI and a response containing the equipment identifier is sent.

Figure 5:
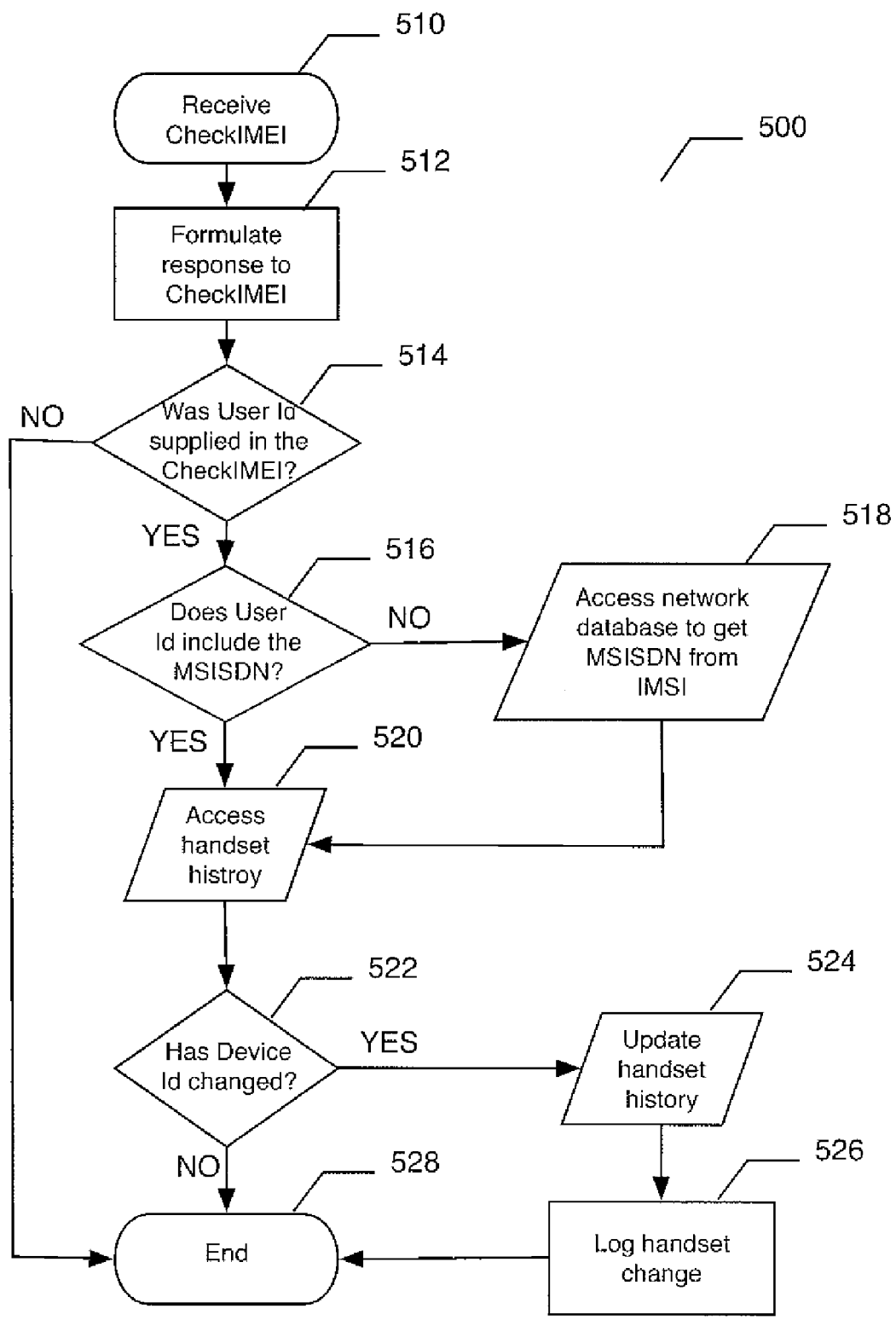

FIG. 5 is a representation of exemplary steps 500 to detect and record that a handset (i.e. a terminal device) associated with a directory number has changed. A checkIMEI request is received 510. A response to the request is formulated 512. A check is made 514 to determine if the user identifier was supplied in the checkIMEI request. When the user identifier was not supplied, processing ends 528. When the user identifier was supplied in the request, a check 516 is made to determine if the user identifier includes a MSISDN. When the user identifier does not include the MSISDN, the network information access interface 206 is accessed 518 to retrieve the MSISDN corresponding to the IMSI. When the MSISDN is known or found, handset history information in the device intelligence database 204 is accessed 520. A check is made 522 to determine if the device identifier (i.e. equipment identifier) associated with the MSISDN has changed. When the device identifier has not changed, processing ends 528. When the device identifier had changed, the handset history information in the device intelligence database 204 is updated 524. A log entry is created 526 recording the change of handset.

Figure 6:
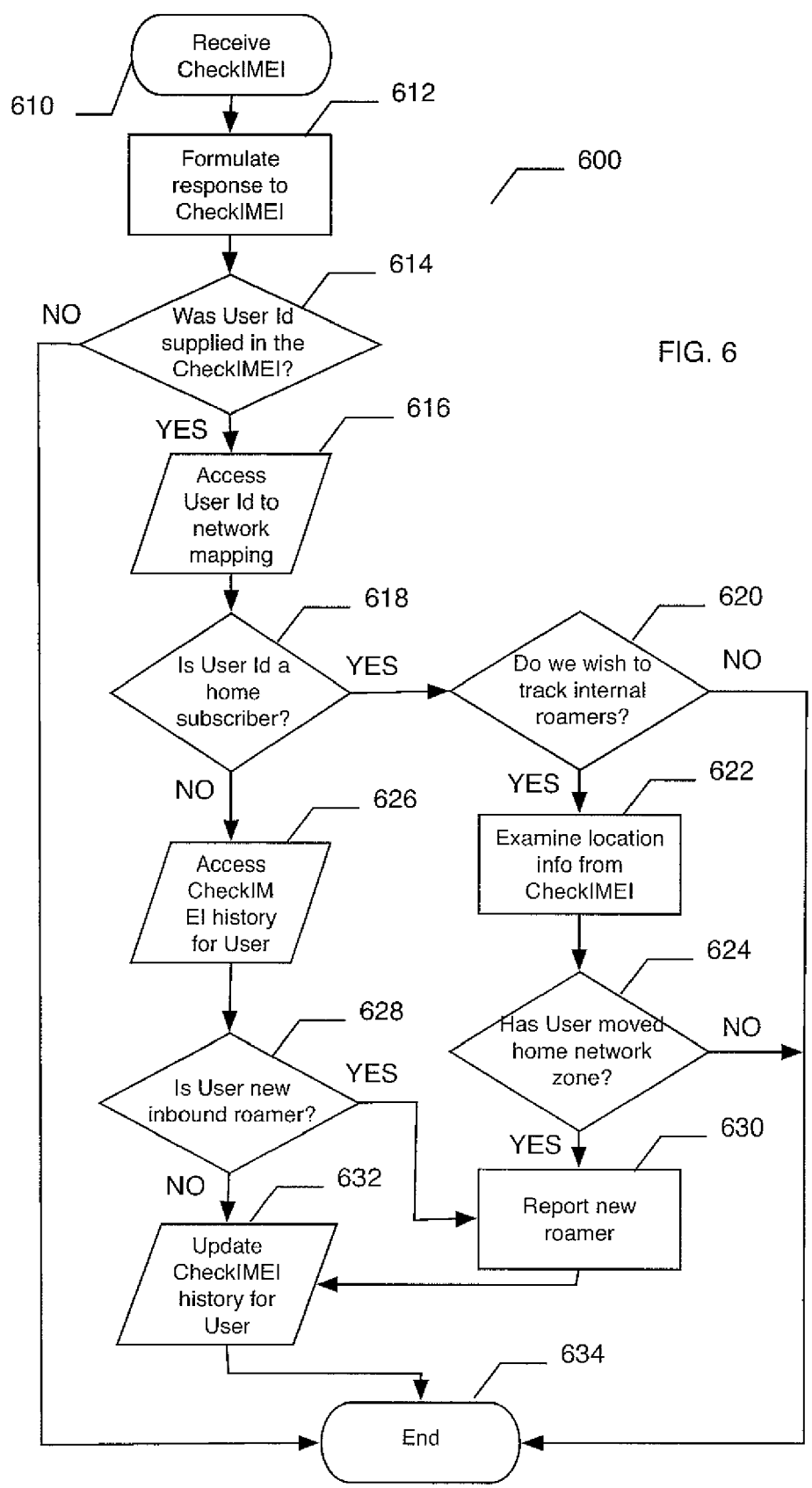

FIG. 6 is a representation of exemplary steps 600 for identifying an inbound roamer's first entry into the network. A checkIMEI request is received 610. A response to the request is formulated 612. A check is made 614 to determine if a user identifier was supplied in the checkIMEI request. When the user identifier was not supplied, processing ends 634. When the user identifier was supplied in the request, the user identifier is mapped to its home network 616 via the network information access interface 206. A check 618 is made to determine if the subscriber associated with the user identifier is a home subscriber of the network. When the subscriber associated with the user identifier is a home subscriber, a check 620 is made to determine if tracking of internal roamers is configured. When tracking of internal roamers is configured, the location information associated with the checkIMEI request is examined 622. A check 624 is made to determine if the subscriber has moved to a different home network zone. When the subscriber associated with the user identifier is not a home subscriber, the device intelligence database 204 is accessed 626 to retrieve historical checkIMEI information associated with the user identifier. A check 628 is made to determine if the user identifier is associated with a new inbound roamer. When the user identifier is associated with a new inbound roamer or when a home subscriber has moved to a different home network zone, a new roamer is reported 630 to the device intelligence database 204. When processing has not otherwise ended, the checkIMEI history information associated with the user identifier is updated 632 in the device intelligence database 204.

Figure 7:
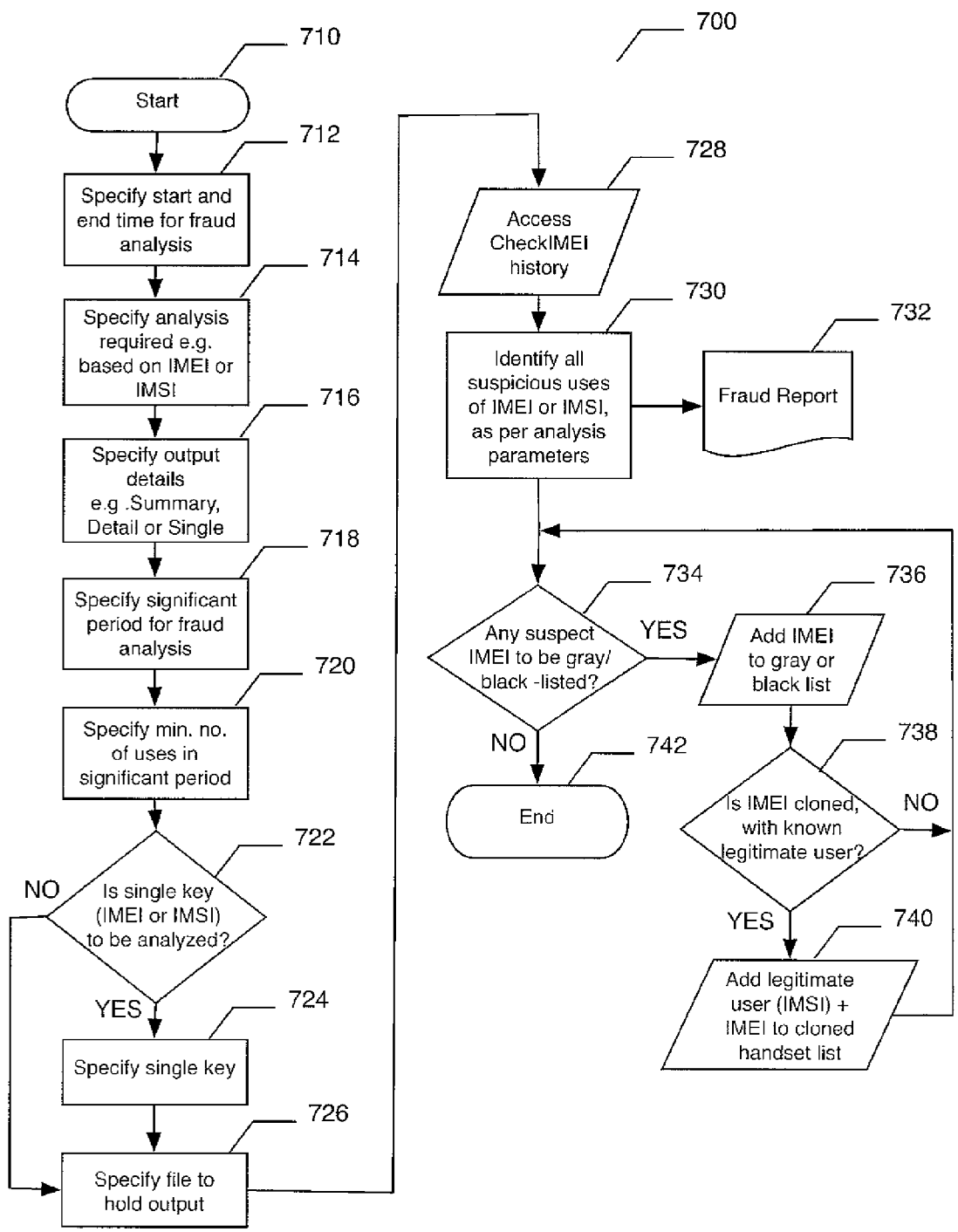

FIG. 7 is a representation of exemplary steps 700 for detecting the occurrence of fraud. The steps begin 710 with the specification 712 of a start and an end time for the fraud analysis. The basis (e.g. using IMEI or IMSI as the key) for the analysis is specified 714. The type of result output details (e.g. summary, detailed or single key) is specified 716. A significant-period for the fraud analysis is specified 718. The minimum number of uses in the significant-period is specified 720. A check 722 is made to determine if a single key (i.e. a single IMEI or IMSI) is to be used for the analysis. When a single key is to be used, the single key is specified 724. When a single key is not used or when the single key has been specified, a target file to hold the output of the fraud analysis is specified 726. Access is made to the device intelligence database 204 to obtain checkIMEI history information 728. Suspicious uses of IMEI or IMSI are identified based on the analysis parameters previously specified 730. The basis for analysis can, for example, include: the same IMSI concurrently associated with more than one IMEI; the same IMSI-IMEI pair concurrently registered with the network at more than one location; and more than one concurrent registration of an IMEI with the network. A fraud report containing information about the suspicious uses identified is generated 732. A check 734 is made to determine if any suspect IMEI are to be added to a grey or a black list. When no IMEI are to be added to a list, processing ends 742. When an IMEI is to be added to a list, the IMEI is added to the appropriate grey or black list 736. A check 738 is made to determine if the suspect IMEI is cloned and is associated with a known legitimate user. When the IMEI is not cloned and associated with a known legitimate user, processing continues at step 734 for any further suspect IMEI identified in the analysis. When the IMEI is cloned and associated with a known legitimate user, the legitimate user's subscriber identifier (e.g. IMSI) and the IMEI are added 740 to the cloned handset list in the device intelligence database 204 and processing continues at step 734 for any further suspect IMEI identified in the analysis. Inclusion of the IMSI-IMEI combination in the cloned handset list allows the legitimate subscriber whose handset (i.e. IMEI) has been cloned to continue to use his handset with his legitimate subscription (i.e. IMSI).

In some networks significant numbers of terminal devices are in use that do not have a unique IMEI. These can include black-market devices where the same IMEI has been assigned to more than one terminal device to overcome some restriction or limitation innate to the network or market. This is different from the common place cloning of a legitimate terminal device's IMEI into another terminal device for fraud purposes. Where particular make/model combinations of terminal devices are known to exists with the same IMEI assigned to multiple terminal devices this information can be stored in the device intelligence database 204 and taken into account in the determination of suspicious use described above with reference to FIG. 7. Also, more than one terminal device can have the IMEI as a result of a manufacturing error.

Figure 8:
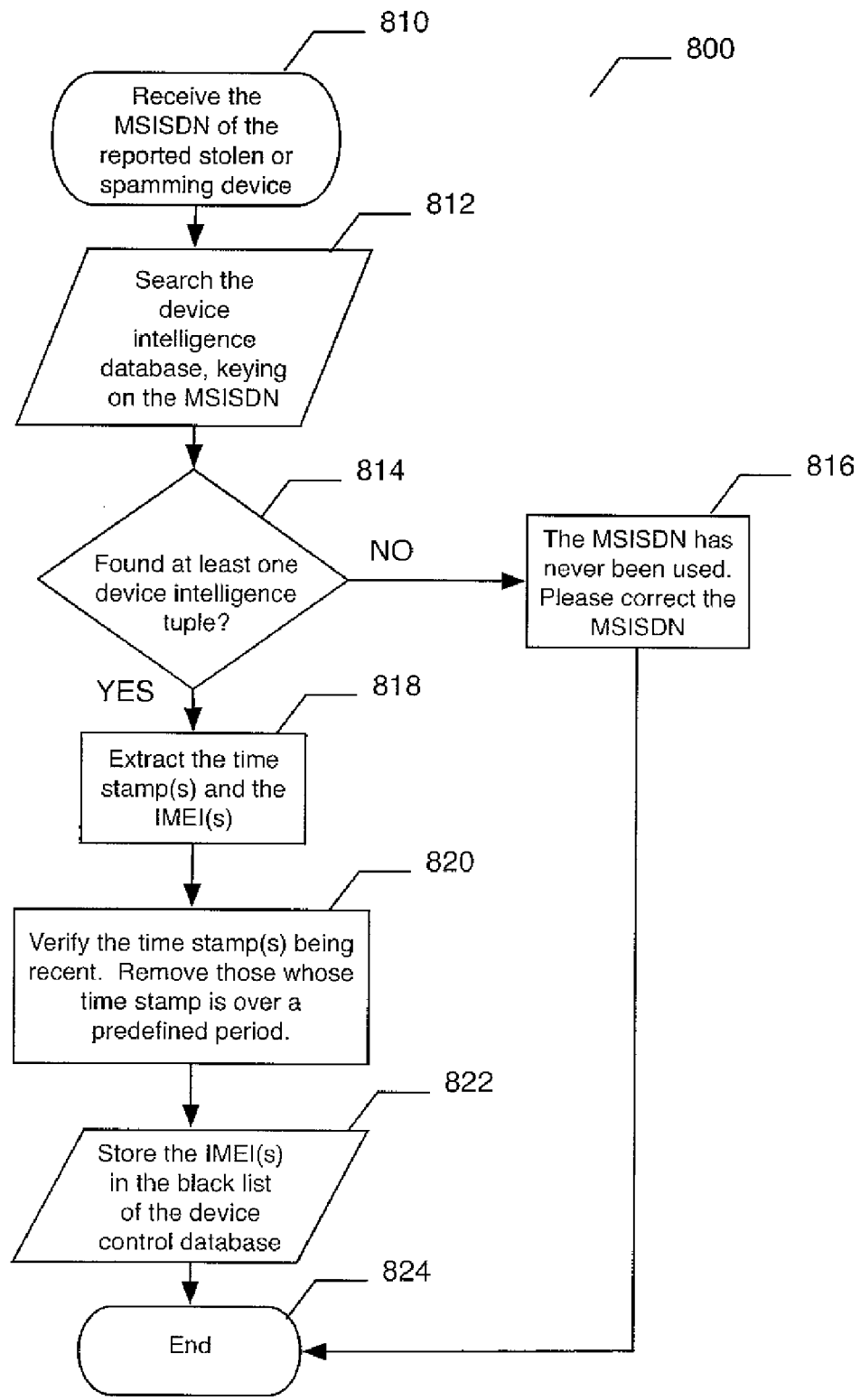

FIG. 8 is a representation of exemplary steps 800 for tracking stolen handsets and identifying originators of SMS/MMS spam (i.e. unsolicited and unwanted) messages. The MSISDN of a reported stolen or spamming device is reported 810. The device intelligence database 204 is searched 812 using the MSISDN as the search key. A check 814 is made to determine if at least one entry (i.e. tuple) was found in the device intelligence database 204 matching the MSISDN. When no entries were found, the MSISDN appears not to have been used and a message asking that the MSISDN be corrected is provided 816 and processing ends 824. When at least one entry for the MSISDN is found in the device intelligence database 204, the one or more time stamps and IMEI associated with the entries are extracted 818. Time stamps that are older than a pre-defined period are removed so that only recent time stamps remain 820. The IMEI identified in the search of the device intelligence database 204 is stored 822 in a black list in the device intelligence database 204. Processing ends 824. Thus starting with the MSISDN of a stolen or spamming handset it is possible to determine the IMEI of the handset and to black-list that IMEI and thereby prevent further network access.

The method according to the present invention can be implemented by a computer program product comprising computer executable program instructions stored on a computer-readable storage medium.

It will be apparent to one skilled in the art that numerous modifications and departures from the specific embodiments described herein may be made without departing from the spirit and scope of the present invention.

The invention claimed is:

1. A terminal device control server for collecting, storing and providing information relating to a plurality of terminal devices in a mobile communication network, each terminal device having an associated equipment identifier, the terminal device control server comprising:
   a device control interface for receiving a terminal device authorization request, containing an equipment identifier and a location in the mobile communication network, and for providing a terminal device authorization response;
   a device intelligence database for storing a plurality of authorization lists each containing a plurality of equipment identifiers and for collecting and storing additional information associated with each equipment identifier including at least one of: a subscriber type associated with a subscriber identifier, a location in the mobile communication network, a service package subscription associated with a subscriber identifier, a device capability set, and one or more timestamps each associated with one of the other additional information;
   a network information access interface providing for the terminal device control server to request and receive from other equipment platforms in the mobile communication network any of the additional information associated with each equipment identifier; and
   a control policy database for storing and applying a plurality of control policies to determine which of the plurality of authorization lists will be applied and in what order the authorization lists will be applied in generating the terminal device authorization response containing a favorable device status based on a result of searching the applied authorization lists for a match to a criterion containing the equipment identifier and the location received in the terminal device authorization request, the terminal device authorization response optionally containing any one or more of a subscriber type associated with the subscriber identifier, and a service package subscription associated with the subscriber identifier;
   wherein the terminal device authorization response is adapted to enable a receiver thereof, based on the response, to either allow or deny access to the mobile communication network and to services in the network to the terminal device having the equipment identifier contained in the terminal device authorization request; further comprising a device intelligence interface configured to:
      receive a terminal device information request containing an identifier associated with an equipment identifier; and
      provide a terminal device information response for the terminal device corresponding to the associated equipment identifier, the terminal device information response containing at least one of: an equipment identifier, a directory number, a subscriber identifier, a location in the mobile communication network, a network membership, a subscription type, a service package subscription, a device capability set, and one or more timestamps;
   wherein the terminal device information response is configured to enable the recipient terminal device to use the information contained therein to adapt service offerings to, and interactions with, the terminal device corresponding to the equipment identifier;
   wherein the favorable device status can further be responsive to any one or more of: a subscription type associated with the subscriber identifier; a service package subscription associated with the subscriber identifier; equipment identifier to subscription identifier pairing enforcement; and legitimate subscriber identifier with cloned equipment identifier authorization; and
   wherein the application of the control policy is a function of at least one of: configuration parameters in the terminal device control server; the subscriber identifier; one or more parameters contained in the terminal device authorization request; a directory number; a capacity demand level in the network; a capabilities set associated with a terminal identifier; a location of the terminal device; a service package subscription associated with the subscriber identifier; a subscription type associated with the subscriber identifier; a billing status associated with the subscriber identifier; and a network membership associated with the subscriber identifier.

2. The terminal device control server of claim 1, wherein the receiver of the terminal device authorization response can be any one of: a mobile switching center, a serving general packet radio service support node, a packet data serving node, and a visitor location register.

3. The terminal device control server of claim 1, wherein the one or more authorization lists include one or more white lists, one or more black lists and one or more grey lists; and wherein inclusion of the equipment identifier, in combination with the location, in an authorization list signifies, for the terminal device associated with the equipment identifier that: access should be allowed when in a white list; access should be denied when in a black list; and access should be allowed with additional special handling when in a grey list; and
   wherein the favorable device status can be set to one of: unknown, and a value determined by an applied control policy, when neither the one of: the equipment identifier, and the equipment identifier and an associated subscriber identifier, are matched in the search of the authorization lists.

4. The terminal device control server of claim 3, the one or more black lists further including one or more deferred-barring lists and an immediate-barring list, and the control policy database further for:
   responsive to a match of the criterion in one of the deferred-barring lists, executing the steps of:

completing one of: sending a warning message to the terminal device associated with the equipment identifier; and running a time-out period; and moving the equipment identifier to one of: the immediate-barring list, and another one of the one or more deferred-barring lists; and responsive to a match of the criterion in the immediate-barring list, denying access to the mobile communication network to the terminal device associated with the equipment identifier.

5. The terminal device control server of claim 1, wherein the one or more parameters contained in the terminal device authorization request include the address of the originator of the terminal device authorization request, and the address is a Signaling Connection and Control Part address containing any one or more of: a network indicator, a routing indicator, a point code and a subsystem number.

6. The terminal device control server of claim 1, the device intelligence database further for collecting and storing additional information associated with the equipment identifier related to any one or more of: presence of the terminal device at a particular location, presence of the terminal device at a particular time; a change of the equipment identifier associated with the subscriber identifier; entry of a roamer into the network; and detection of a fraud event.

7. The terminal device control server of claim 1, further comprising a device intelligence interface for:
receiving a terminal device information request containing a location and optionally containing a time value and an additional information value; and
providing a terminal device information response containing information including: one or more equipment identifiers associated with terminal devices having:
when no time value is contained in terminal device information request, corresponding location information indicating the most recent location of terminal device is one of:
the same as the location contained in the terminal device information request, and
within a pre-determined distance of the location contained in the terminal device information request:
when the time value is contained in terminal device information request, corresponding location and timestamp information indicating the location of the terminal device, proximate the time value, is one of:
the same as the location contained in the terminal device information request, and
within a pre-determined distance of the location contained in the terminal device information request; and
when the additional information value is contained in terminal device information request, corresponding additional information that matches the additional information value, when an additional information value is contained in the terminal device information request.

8. The terminal device control server of claim 1, further comprising a device intelligence interface for:
receiving a terminal device information request; and
providing a terminal device information response containing information including: one or more equipment identifiers associated with terminal devices, and corresponding location information indicating the most recent location of each terminal device.

9. The terminal device control server of claim 1, further comprising a device intelligence interface for:

receiving a terminal device information request including a trigger event and a trigger group; and
providing a terminal device information response including one of an equipment identifier and a subscriber identifier, when the trigger event occurs for a terminal device associated with the trigger group;
wherein, the trigger group contains one or more of any of: a equipment identifier, a subscriber identifier, a directory number, a device type, a subscription type, a service package subscription, a network membership and a device capability.

10. The terminal device control server of claim 1, wherein said additional information associated with each equipment identifier includes a location in the mobile communication network and one or more timestamps associated with the location.

11. A method for a terminal device control server in a mobile communication network, the network having a plurality of terminal devices each having an equipment identifier, the method comprising the steps of:
receiving a terminal device authorization request containing an equipment identifier and a location in the mobile communication network;
selecting a control policy from a plurality of control policies;
searching one or more authorization lists, selected from a plurality of authorization lists and in an order that is responsive to the selected control policy, for a match to a criterion containing the equipment identifier and the location;
providing a terminal device authorization response containing a favorable device status based on a result of the authorization list search, and optionally containing any one or more of a subscriber type associated with a subscriber identifier, and a service package subscription associated with a subscriber identifier;
wherein the terminal device authorization response can is adapted to enable the receiver thereof, based on the response, to either allow or deny access to the mobile communication network and to services in the network to the terminal device having the equipment identifier contained in the device authorization request; and
receiving a terminal device information request containing an identifier associated with an equipment identifier; and
providing a terminal device information response for the terminal device corresponding to the associated equipment identifier, the terminal device information response containing any one or more of: an equipment identifier, a directory number, a subscriber identifier, a location in the mobile communication network, a network membership, a subscription type, a service package subscription, a device capability set, and one or more timestamps;
wherein the terminal device information response is adapted to enable the recipient to use the information contained therein to adapt service offerings to, and interactions with, the terminal device corresponding to the equipment identifier; and
collecting and storing additional information associated with the equipment identifier including any one or more of: a subscriber identifier, a subscriber type, a directory number, a location in the mobile communication network, a service package subscription, a network membership, a device capability set, and one or more timestamps each associated with one of the other additional information;

wherein the selection of the control policy is a function of any one or more of: configuration parameters in the terminal device control server; the subscriber identifier; one or more parameters contained in the terminal device authorization request; the directory number; a capacity demand level in the network; a capabilities set associated with the terminal identifier; a location of the terminal device; a service package subscription associated with the subscriber identifier; a subscription type associated with the subscriber identifier; a billing status associated with the subscriber identifier; and a network membership associated with the subscriber identifier.

12. The method of claim 11, wherein the receiver of the terminal device authorization response can be any one of: a mobile switching center, a serving general packet radio service support node, a packet data serving node, and a visitor location register.

13. The method of claim 11, wherein the one or more authorization lists include one or more white lists, one or more black lists and one or more grey lists; and wherein inclusion of the equipment identifier, optionally in combination with any of the subscriber identifier, the directory number and the location, in an authorization list signifies, for the terminal device having the equipment identifier, that:
   access should be allowed when in a white list; access should be denied when in a black list; and access should be allowed with additional special handling when in a grey list; and
   wherein the favorable device status can be set to one of: unknown, and a value determined by the selected control policy, when neither the one of: the equipment identifier, and the equipment identifier and the associated subscriber identifier, are matched in the search of the authorization lists.

14. The method of claim 13, the one or more black lists further including one or more deferred-barring lists and an immediate-barring list, and the method further comprising the steps of:
   responsive to a match of the criterion in one of the deferred-barring lists, executing the steps of:
      completing one of: sending a warning message to the terminal device associated with the equipment identifier; and running a time-out period; and
      moving the equipment identifier to one of: the immediate-barring list, and another one of the one or more deferred-barring lists; and
   responsive to a match of the criterion in the immediate-barring list, denying access to the mobile communication network to the terminal device associated with the equipment identifier.

15. The method of claim 11, wherein the favorable device status can further be responsive to any one or more of: a subscription type associated with a subscriber identifier; a service package subscription associated with a subscriber identifier; equipment identifier to subscription identifier pairing enforcement; and legitimate subscriber identifier with cloned equipment identifier authorization.

16. The method of claim 11, wherein the one or more parameters contained in the terminal device authorization request include the address of the originator of the terminal device authorization request, and the address is a Signaling Connection and Control Part address containing any one or more of: a network indicator, a routing indicator, a point code and a subsystem number.

17. The method of claim 11, further comprising the step of collecting and storing additional information associated with the equipment identifier related to any one or more of: presence of the terminal device at a particular location, presence of the terminal device at a particular location at a particular time; a change of the equipment identifier associated with the subscriber identifier; entry of a roamer into the network; and detection of a fraud event.

18. The method of claim 11, further comprising the steps of:
   receiving a terminal device information request containing a location and optionally containing a time value and an additional information value; and
   providing a terminal device information response containing information including: one or more equipment identifiers associated with terminal devices having:
      when no time value is contained in terminal device information request, corresponding location information indicating the most recent location of terminal device is one of:
         the same as the location contained in the terminal device information request, and
         within a pre-determined distance of the location contained in the terminal device information request:
      when the time value is contained in terminal device information request, corresponding location and timestamp information indicating the location of the terminal device, proximate the time value, is one of:
         the same as the location contained in the terminal device information request, and
         within a pre-determined distance of the location contained in the terminal device information request; and
      when the additional information value is contained in terminal device information request, corresponding additional information that matches the additional information value, when an additional information value is contained in the terminal device information request.

19. The method of claim 11, further comprising the steps of:
   receiving a terminal device information request; and
   providing a terminal device information response containing information including: one or more equipment identifiers associated with terminal devices, and corresponding location information indicating the most recent location of each terminal device.

20. The method of claim 11, further comprising the steps of:
   receiving a terminal device information request including a trigger event and a trigger group; and
   providing a terminal device information response including one of an equipment identifier and a subscriber identifier, when the trigger event occurs for a terminal device associated with the trigger group;
   wherein, the trigger group contains one or more of any of: a equipment identifier, a subscriber identifier, a directory number, a device type, a subscription type, a service package subscription, a network membership and a device capability.

* * * * *